(12) United States Patent
Huang et al.

(10) Patent No.: US 6,265,798 B1
(45) Date of Patent: Jul. 24, 2001

(54) MOTOR HAVING A MAGNETIC BEARING (75) Inventors: Wen-hsi Huang; Kuo-cheng Lin; Te-tsai Chuang; Min-shi Tsai, all of Taoyuan (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 09/487,210

(22) Filed: Jan. 19, 2000

(30) Foreign Application Priority Data

Aug. 2, 1999 (TW) ............................................... 088113276

(51) Int. Cl.[7] ................................................... H02K 7/09
(52) U.S. Cl. ............................ 310/90.5; 310/90; 384/107
(58) Field of Search .................... 310/90.5, 90; 384/107, 384/112, 114

(56) References Cited

U.S. PATENT DOCUMENTS

| 3,899,223 | * | 8/1975 | Baermann | 308/10 |
| 5,280,208 | * | 1/1994 | Komura et al. | 310/90 |
| 5,561,335 | * | 10/1996 | Dunfield et al. | 310/90.5 |
| 5,821,655 | * | 10/1998 | Tokushima et al. | 310/90 |
| 6,057,620 | * | 5/2000 | Chen et al. | 310/90.5 |

* cited by examiner

*Primary Examiner*—Nestor Ramirez
*Assistant Examiner*—Thanh Lam (57) ABSTRACT

A motor having a magnetic bearing comprises a base formed with a bearing seat; a stator fixed to the base; a rotor provided with a rotation shaft and rotatable with respect to the stator by magnetic forces generated from excitation; a bearing fixed to the bearing seat of the base for receiving the rotation shaft of the rotor; and a magnetic element pair including a first element and a second element. The first element is telescopically interference-fitted on the rotation shaft, the second element is fixed relative to the bearing seat and lets the rotation shaft insert therethrough, and a magnetic force is generated between the first element and the second element. When the rotor rotates and an external force acts on the rotor in a direction, a magnetic force between the magnetic element pair counteracts the external force to achieve an axial positioning effect and avoid the contact wear.

1 Claim, 7 Drawing Sheets

MOTOR HAVING A MAGNETIC BEARING

FIELD OF THE INVENTION

The present invention relates to a motor, and especially a motor having a magnetic bearing that incurs no rotation wear.

BACKGROUND OF THE INVENTION

Figure 1:
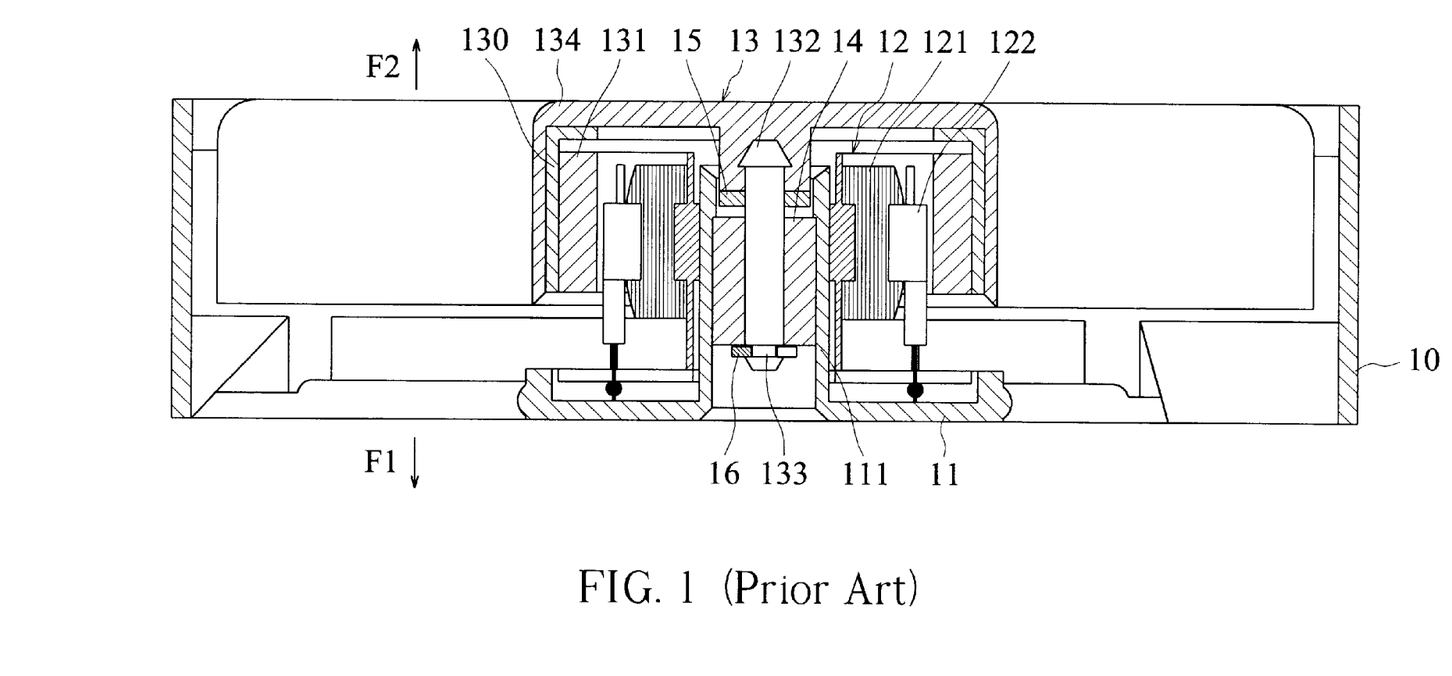
FIG. 1 shows a conventional fan motor.

In most prior art motors, the positioning of the rotation shaft is achieved by a heatproof washer or a metallic C-ring. A conventional self-lube bearing fan motor, as shown in FIG. 1, comprises: a base 11, a stator 12, a rotor 13, a bearing 14, an elastic washer 15, and a C-ring 16.

The base 11 is located at the central location of a fan frame 10. The base 11 and the fan frame 10 are integrally formed. In the central location of the base 11 is provided a bearing seat 111. The stator 12 is telescopically fitted on the bearing seat 111 and is fixed relative to the base 11. The stator 12 includes a plurality of coils 121 and a plurality of silicon steel sets 122. The bearing 14 is a self-lube bearing fitted in the bearing seat 111 of the base 11. The rotor 13 includes a hollow cylinder 130 having an open end. The outer wall of the cylinder 130 engages with a fan blade set 134 and on the inner wall of the cylinder 130 is provided a magnet 131. At the central location of the cylinder 130 is provided a rotation shaft 132. A groove 133 is formed near the lower end of the rotation shaft 132. The rotation shaft 132 is received by the bearing 14. The elastic washer 15 is telescopically fitted on the rotation shaft 132 at an upper location thereof to provide an elastic buffer. The C-ring 16 is engaged in the groove 133 near the lower end of the rotation shaft 132 so that rotation shaft 132 is prevented from being disengaged from the base 11.

From the above description, it can be know that in the prior art motor, the C-ring 16 is used to axially position the rotation shaft 132 of the rotor 13 so that when the rotor 13 rotates after the excitation of the coil 121 and generates airflow F1, the C-ring 16 prevents the bearing 14 from disengaging from the base 111 due to the force F2 exerted on the fan blade set 134.

The positioning of the rotation shaft in the aforementioned prior art motor involves the following drawbacks:
1. When the motor operates, the contact wear and friction between the C-ring 16 and bearing 14 are incurred and the life of the motor will be reduced.
2. The friction between the C-ring 16 and the bearing 14 incurs noises or varied rotation speeds.
3. The rotor 13 and the stator 12 are designed with a magnetic bias. However, when the rotor 13 rotates, the rotation shaft 132 is moved by an external force and the equilibrium position of the rotor relative to the stator is determined by the external force. This results in a big problem in motor design.

SUMMARY OF THE INVENTION

An object of the invention is to provide a motor having a magnetic bearing that utilizes a magnetic force to adjust the position of the rotation shaft to achieve a non-contact axial positioning effect and to avoid contact wear when the motor operates.

Another object of the invention is to provide a motor having a magnetic bearing that utilizes a magnetic force to adjust the radial position of the rotation shaft to achieve a non-contact radial positioning effect and to avoid contact wear when the motor operates.

Yet another object of the invention is to provide a motor having a magnetic bearing that utilizes a magnetic force to avoid the insufficiency of the original magnetic bias so that a stationary equilibrium position of the rotor can be achieved when the motor operates.

To achieve the above-mentioned objects, a motor having a magnetic bearing in accordance with the invention comprises a base formed with a bearing seat; a stator fixed to the base; a rotor provided with a rotation shaft and rotatable with respect to the stator by magnetic forces generated from excitation; a bearing fixed to the bearing seat of the base for receiving the rotation shaft of the rotor; and a magnetic element pair including a first element and a second element. The first element is telescopically interference-fitted on the rotation shaft, the second element is fixed relative to the bearing seat and letting the rotation shaft insert therethrough, and a magnetic force is generated between the first element and the second element. The magnetic force pushes the rotation shaft toward or out of the base.

When the above-mentioned motor rotates, an external force acts on the rotor in a direction and a magnetic force between the magnetic element pair is utilized to counteract the external force so that the axial positioning of the rotation shaft can be achieved and the contact wear can be avoided. In addition, the insufficiency of the magnetic bias between the rotor and the stator can be avoided and the rotor can be kept in a stationary equilibrium position when the motor operates.

Furthermore, a magnetic bearing can be used to replace the bearing of the above-mentioned motor for radially positioning the rotation shaft. The magnetic bearing is provided in the bearing seat and comprises at least one magnetic element pair including a first element and a second element. The first element is telescopically interference-fitted on the rotation shaft and the second element is fixed relative to the bearing seat and lets the rotation shaft insert therethrough. Each of the first element and the second element is formed with a tapered contact surface, and a magnetic force is generated between the first element and the second element. The first element and the second element can achieve not only an axial positioning effect but also a radial positioning effect.

BRIEF DESCRIPTION OF THE DRAWINGS

The above and other objects and the features and effects of the present invention can be best understood by referring to the following detailed description of the preferred embodiment and the accompanying drawings, wherein.

DETAILED DESCRIPTION OF THE PREFERRED EMBODIMENTS

Figure 2:
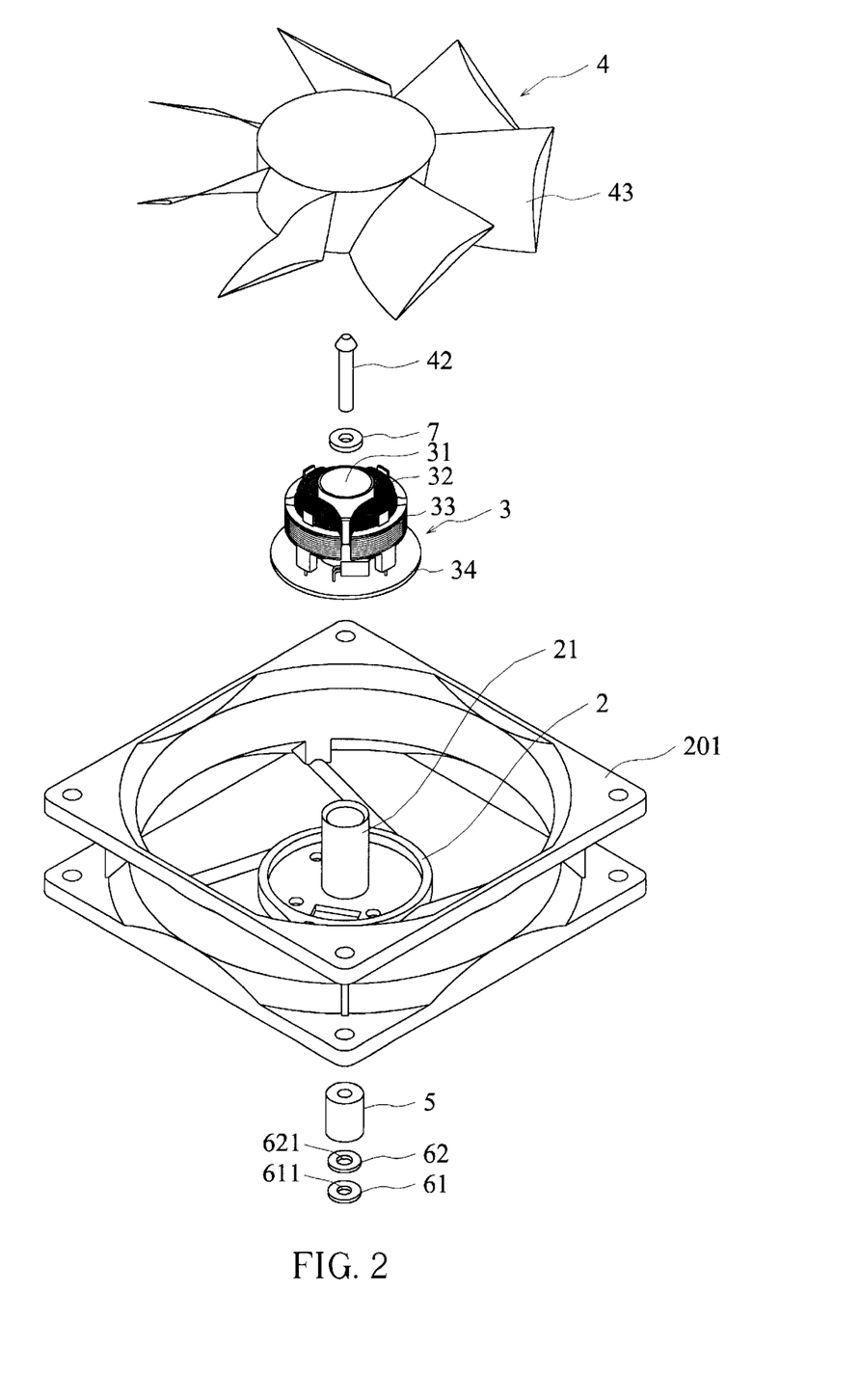
FIG. 2 is an exploded view of a motor in accordance with the first preferred embodiment of the invention.
Figure 3:
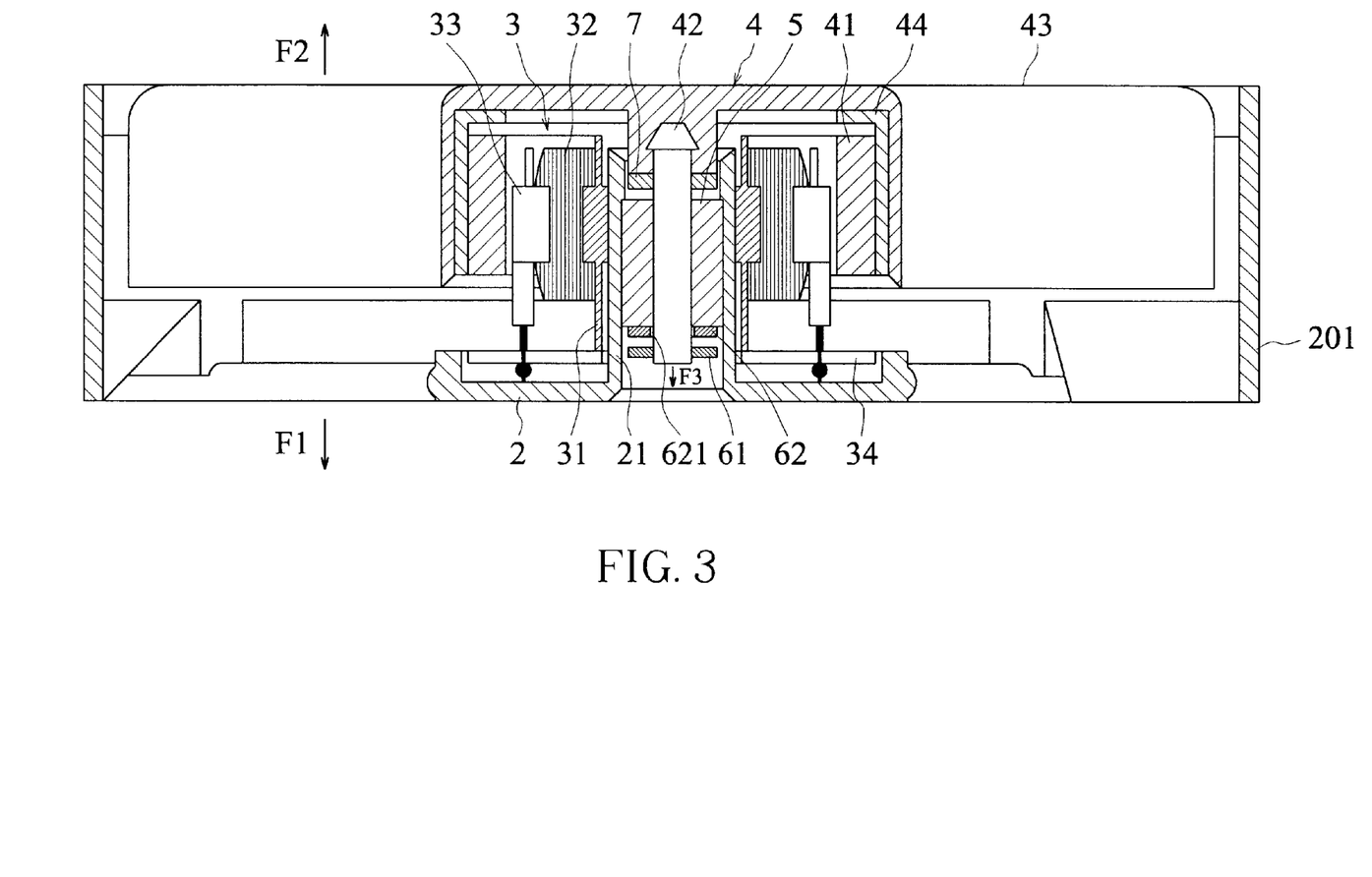
FIG. 3 is a sectional view of a motor in accordance with the first preferred embodiment of the invention.

Referring to FIGS. 2 and 3, a fan motor in accordance with the first preferred embodiment of the invention comprises a base 2, a stator 3, a rotor 4, a bearing 5, a magnetic element pair 6, and an elastic washer 7.

The base 2 is located at the central location of and is integrally formed with a fan frame 201. At the central location of the base 2 is formed a bearing seat 21.

At the central location of the stator 3 is provided an accommodation portion 31, and at each of a plurality of peripheral locations around the accommodation portion 31 are provided a coil 32 and a silicon steel set 33. At the bottom of the stator 3 is provided a circuit board 34. The coils 32 are electrically connected with the circuit board 34. The accommodation portion 31 is telescoped on the outer surface of the bearing seat 21 of the base 2.

The rotor 4 is generally a hollow cylinder 44 having an open end. The outer wall of the rotor 4 is attached with a plurality of fan blades 43. On the inner surface of the rotor 4 is provided a ring-typed magnet 41. A rotation shaft 42 is provided at the central location of the rotor 4 and is accommodated in the bearing 5. When the coils 32 of the stator 3 are supplied with electricity and cause excitation, magnetic forces are generated and cause the rotor 4 to rotate relative to the stator 3.

The bearing 5 is self-lube and is secured within the bearing seat 21 of the base 2. The bearing 5 accommodates the rotation shaft 42 of the rotor 4.

The magnetic element pair 6 comprises a first element 61 and a second element 62. Each of the facing poles between the first element 61 and the second element 62 is an S pole so that the two elements are repulsive to each other. The first element 61 is in the form of a circular ring formed with a central hole 611 within which the lower end of the rotation shaft 42 is interference-fitted. The second element 62 is secured to the bottom end of the bearing 5 and is located over the first element 61. The second element 62 is formed with a central hole 621 that is bigger than the rotation shaft 42 in diameter so that the rotation shaft 42 is inserted through the central hole 621 of the second element 62 without contact therewith.

The elastic washer 7 is telescoped on the rotation shaft 42 at its upper section to provide an elastic buffer between the rotor 4 and the bearing 5.

When the rotor 4 rotates, a downward force F1 is caused by airflow and a force F2 exerts on the rotation shaft 42 to push it outward from the base 2. In addition, a magnetic force F3 is exerted on the first element 61 that transmits the magnetic force F3 onto the rotation shaft 42 to move it in a downward direction in FIG. 3. The magnetic force F3 reacts against the force F2 and prevents the rotation shaft 42 from escaping from the bearing 5.

Due to that the magnetic force F3 increases when the first element 61 and the second element 62 move closer to each other, i.e. the magnetic force F3 is inversely proportional to the square of the distance between the first element 61 and the second element 62. Therefore, the first element 61 and the second element 62 do not contact, and no contact wear between the first element 61 and the second element 62 is incurred. Thereby, a positioning effect without incurring contact wear can be achieved. In addition, the magnetic force F3 acts against the force F2 so that the insufficiency of the magnetic bias between the rotor 4 and the stator 3 can be avoided.

Figure 4:
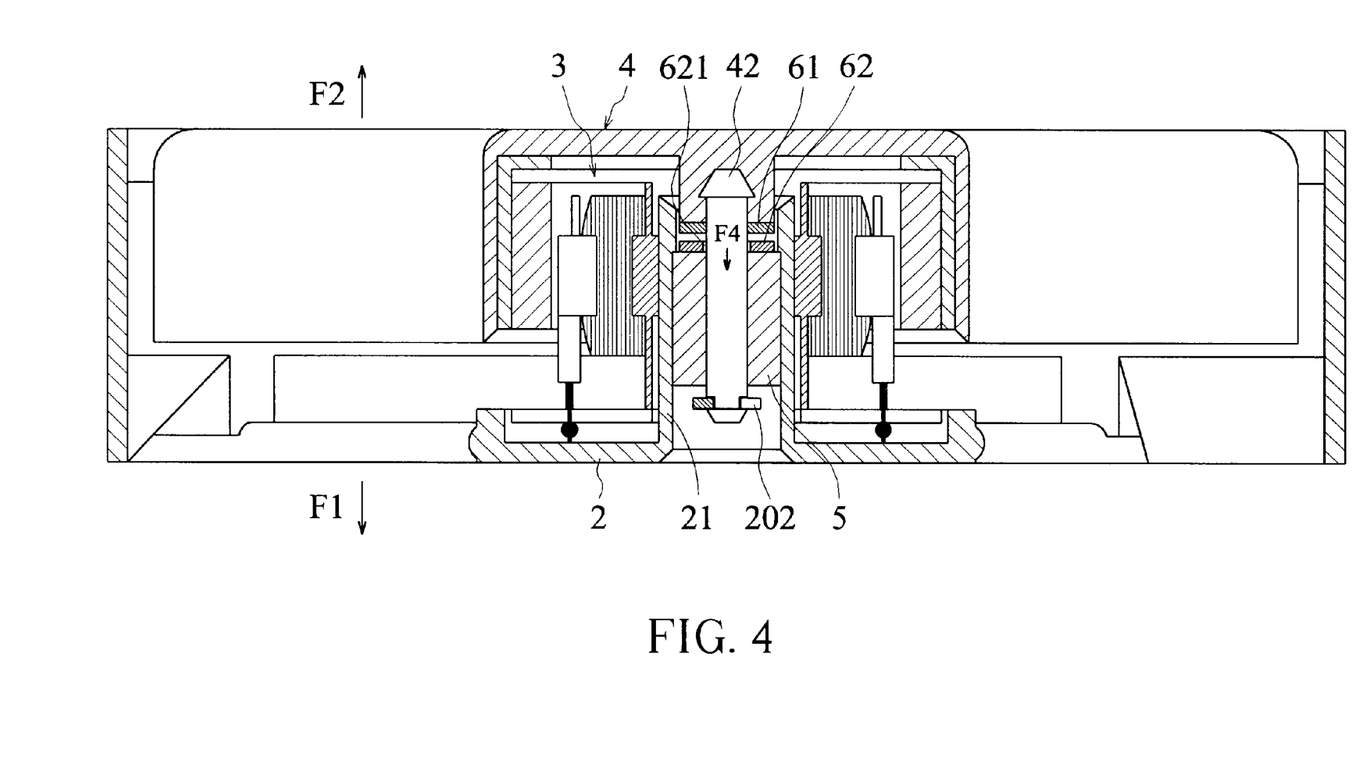
FIG. 4 is a sectional view of a motor in accordance with the second preferred embodiment of the invention.

Referring to FIG. 4 that shows the motor in accordance with the second embodiment of the invention, the first element 61 and the second element 62 of the magnetic element pair 6 generate an attractive magnetic force F4 between them. The first element 61 is a circular magnet and is interference fitted on the rotation shaft 42 near the upper end thereof The second element 62 is a circular iron plate and is fixed on the upper end of the bearing 5 below the first element 61. A C-ring 202 is provided near the lower end of the rotation shaft.

When the rotor 4 rotates, a downward force F1 is caused by airflow and a force F2 exerts on the rotation shaft 42 to push it outward from the base 2. However, due to that there is an attractive force F4 between the first element 61 and the second element 62, and the second element 62 is fixed to the bearing 5 below the first element 61, the rotation shaft 42 is moved downward into the base 2 so that the contact wear between the C-ring 202 and the bearing 5 can be prevented. In this preferred embodiment, a magnet is adopted as the first element 61 and an iron plate as the second element 62 in order to reduce the material cost. However, two magnets instead of one magnet can be adopted to obtain a greater attractive force.

Figure 5:
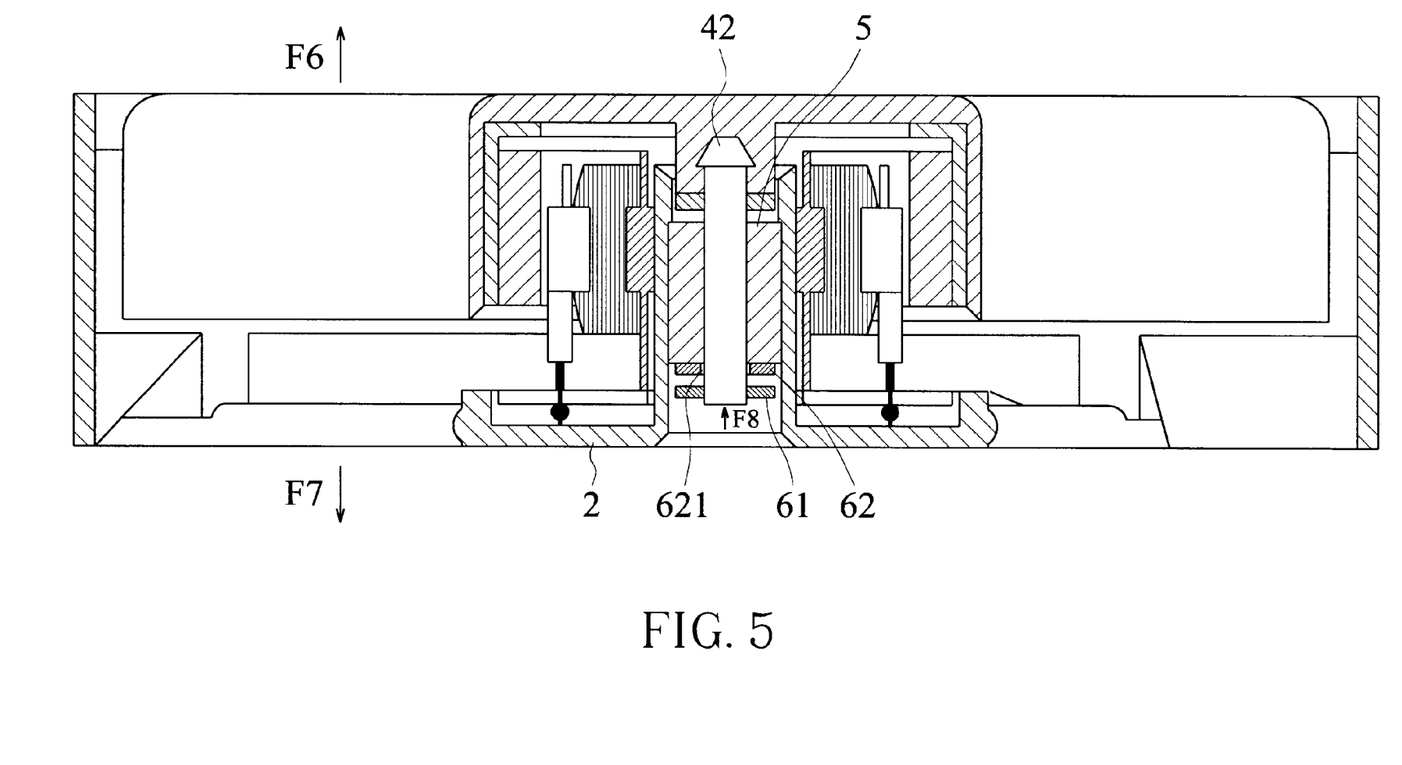
FIG. 5 is a sectional view of a motor in accordance with the third preferred embodiment of the invention.

Referring to FIG. 5 that shows the motor in accordance with the third embodiment of the invention, the rotor 4 rotates in such a direction that the airflow generated, as indicated by arrow F6, flows upward from the base 2. In this case, a reaction force F7 is exerted on the rotor 4 to push it toward the base 2. To avoid the contact wear between the rotor 4 and the bearing 5, a magnetic element pair 6 consisting of a first magnetic element 61 and a second magnetic element 62 is provided. The first magnetic element 61 and a second magnetic element 62 are two magnets in the same magnetic orientation. The first element 61 is telescopically interference-fitted on the rotation shaft 42 near the lower end thereof; the second element 62 is fixed to the lower end of the bearing 5 over the first element 61. The diameter of the central hole 621 of the second element 62 is greater than that of the rotation shaft 42 so that the rotation shaft 42 is inserted through the central hole 621 of the second element 62 without coming into contact with it. Thereby, the attractive force F8 between the first and second magnetic elements 61 and 62 counteracts the force F7 to avoid the contact wear between the rotor 4 and the bearing 5.

Figure 6:
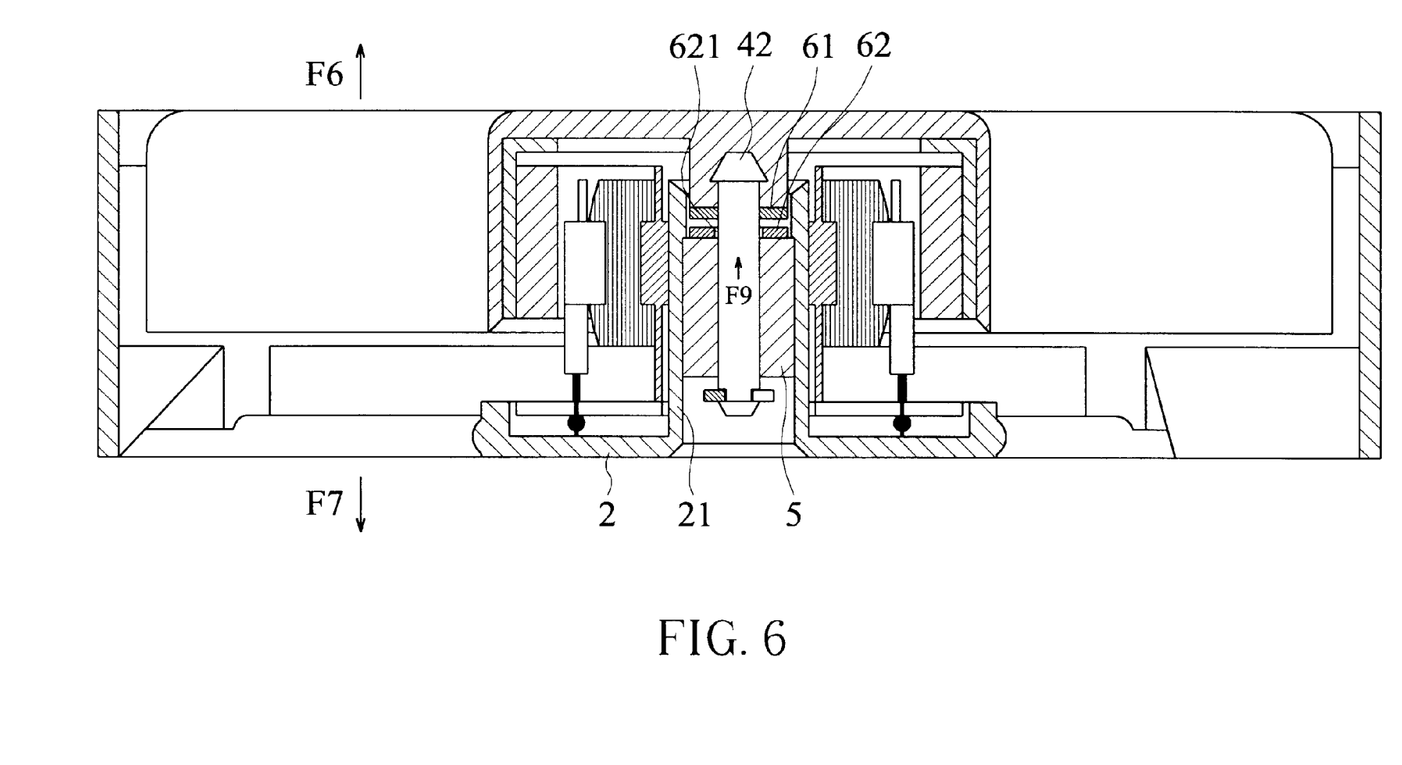
FIG. 6 is a sectional view of a motor in accordance with the fourth preferred embodiment of the invention.

Referring to FIG. 6 that shows the motor in accordance with the fourth embodiment of the invention, the rotor 4 rotates in such a direction that the airflow generated, as indicated by arrow F6, flows upward from the base 2. In this case, a reaction force F7 is exerted on the rotor 4 to push it toward the base 2. The first magnetic element 61 and the second magnetic element 62 are two magnets in opposite orientations respectively. The first element 61 is telescopically interference-fitted on the rotation shaft 42 near the upper end thereof; the second element 62 is fixed on the upper end of the bearing 5 below the first element 61. The diameter of the central hole 621 of the second element 62 is greater than that of the rotation shaft 42 so that the rotation shaft 42 is inserted through the central hole 621 of the second element 62 without coming into contact with it. Thereby, the repulsive force F9 between the first and second magnetic elements 61 and 62 counteracts the force F7 to avoid the contact wear between the rotor 4 and the bearing 5.

Figure 7:
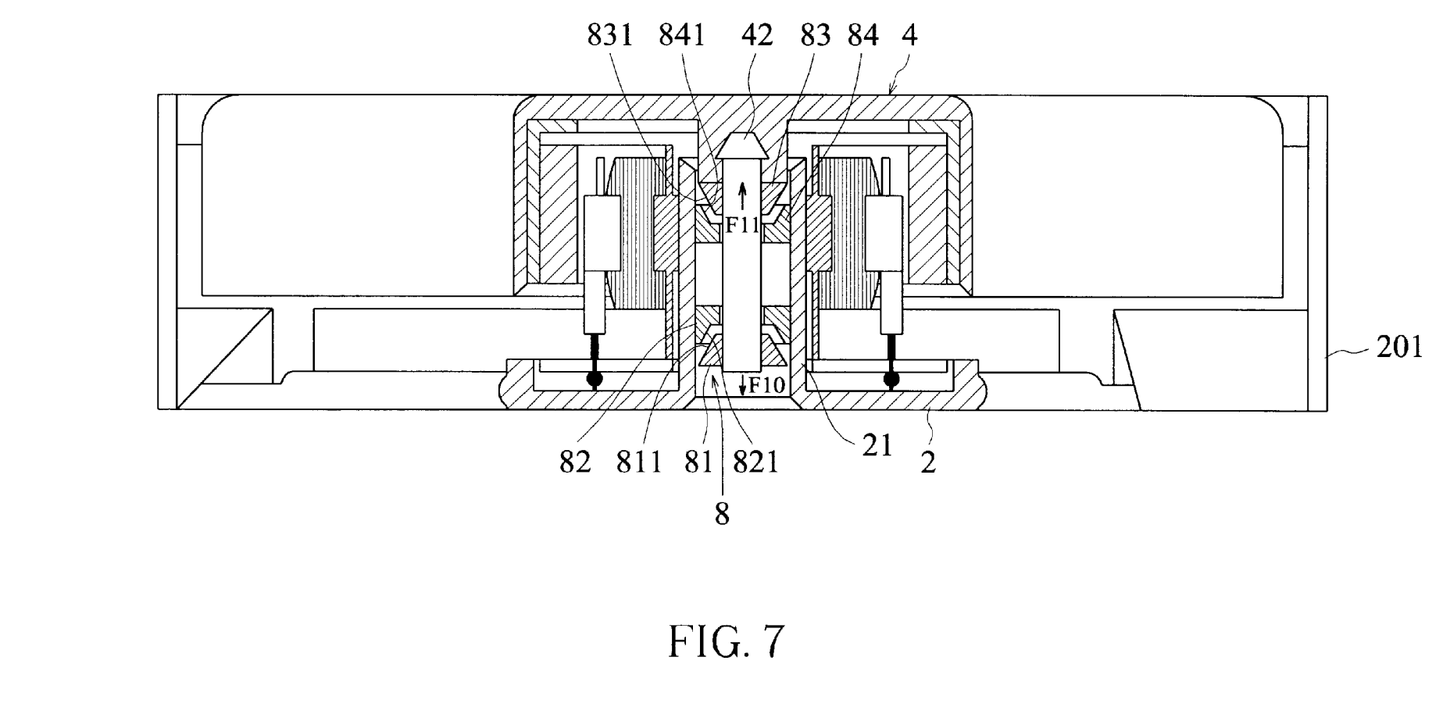
FIG. 7 is a sectional view of a motor in accordance with the fifth preferred embodiment of the invention.

Referring to FIG. 7 that shows the motor in accordance with the fifth embodiment of the invention, a magnetic bearing 8, instead of a conventional bearing such as a self-lube bearing, is adopted. The magnetic bearing 8 comprises two magnetic element pairs. The first magnetic element pair comprises a first element 81 and a second element 82 that are two magnets in opposite orientations respectively and generate a repulsive force F10 between them. The first element 81 is telescopically interference-fitted on the lower portion of the rotation shaft 42. The second element 82 is located over the first element 81 and is fixed to the bearing seat 21. The diameter of the central hole of the second element 82 is greater than that of the rotation shaft 42 so that the rotation shaft 42 can be inserted through the second element 82 without contact therewith. The first and second elements 81 and 82 are formed with tapered contact surfaces 811 and 821 respectively. The second magnetic element pair comprises the first element 83 and the second element 84 that are also two magnets in opposite orientations respectively and generate a repulsive force F11 between them. The first element 83 is telescopically interference-fitted on the upper portion of the rotation shaft 42. The second element 84 is located below the first element 83 and is fixed to the bearing seat 21. The central hole of the second element 84 is bigger than the rotation shaft 42 in diameter so that the rotation shaft 42 can be inserted through the second element 84 without contact therewith. The first and second elements 83 and 84 are formed with tapered contact surfaces 831 and 841.

Due to the repulsive force F10 (F11) between the tapered contact surfaces 811 and 821 (831 and 841) of the first and second elements 81 and 82 (83 and 84), the rotation shaft 42 can be radially positioned at the central of the second element 82 (84).

Additionally, the repulsive magnetic force F10 that pushes the rotation shaft 42 toward the base 2 and the force F11 that pushes the rotation shaft 42 out of the base 2 cooperatively provide an axial positioning effect to the rotation shaft 42.

In sum, the following advantages can be achieved by the invention:

An axial positioning effect can be achieved by a magnetic force so that contact wear can be avoided the motor in accordance with the invention operates.

The axial positioning effect of the rotation shaft 42 can be achieved by magnetic forces and the rotation shaft 42 has no need to be supported by a bearing.

A magnetic force is used to compensate the insufficiency of the magnetic bias between the rotor 4 and the stator 3 so that a good stability in rotation can be achieved.

Although the preferred embodiments of the invention have been illustrated and described, it will be obvious to those skilled in the art that various modifications may be made without departing from the scope and spirit of the invention defined by the appended claims.

What is claimed is:

1. A motor having a magnetic bearing structure, comprising:

a base formed with a bearing seat;

a stator fixed to said base;

a rotor provided with a rotation shaft and being rotatable with respect to said stator by magnetic forces generated from excitation; and a magnetic bearing provided in the bearing seat and comprising a first magnetic element pair and a second magnetic element pair, wherein the first magnetic element pair includes a first element that is slipped and fixed on the rotation shaft at the lower portion thereof and a second element that is fixed to the bearing seat over the first element and slidably slipped on the rotation shaft with the magnetic force generated between the first element and the second element in order to keep the rotation shaft axially positioned, and the second magnetic element pair includes a first element that is slipped and fixed on the rotation shaft at the upper portion thereof and a second element that is fixed to the bearing seat below the first element and slidably slipped on the rotation shaft with the magnetic force generated between the first element and the second element in order to keep the rotation shaft axially positioned;

the first and second elements of both the first magnetic element pair and the second magnetic element pair are characterized in that the first element and the second element are formed with a tapered contact surface respectively with the magnetic force generated between the first element and the second element in order to keep the rotation shaft radially positioned.

* * * * *